No. 694,470. Patented Mar. 4, 1902.
C. GOUCHON.
MOTOR CARRIAGE.
(Application filed Jan. 15, 1901.)
(No Model.)
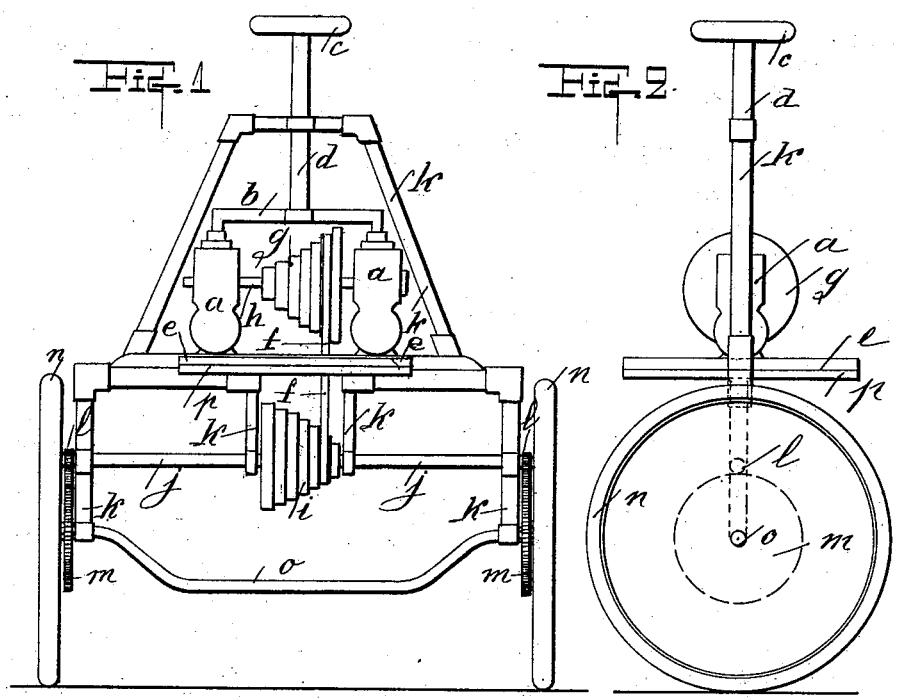
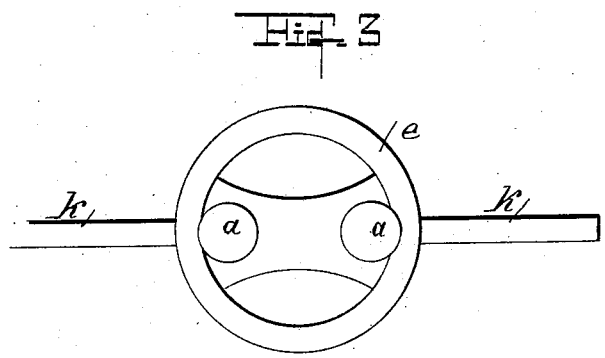
Witnesses:
Inventor:
Charles Gouchon,
By H. H. de Vos.
Attorney.

UNITED STATES PATENT OFFICE.

CHARLES GOUCHON, OF LISIEUX, FRANCE.

MOTOR-CARRIAGE.

SPECIFICATION forming part of Letters Patent No. 694,470, dated March 4, 1902.

Application filed January 15, 1901. Serial No. 43,344. (No model.)

*To all whom it may concern:*

Be it known that I, CHARLES GOUCHON, a citizen of the Republic of France, residing at Aller du Bouloir, Lisieux, France, have invented a certain new and useful Improvement in Motor-Carriages, of which the following is a specification, such as will enable others skilled in the art to which it appertains to make and use the same.

The object of this invention is to provide a motor-carriage of the fore-carriage type with a motor carried by the fore carriage and mounted thereon and connected with the fore wheels in such manner that while motion may be transmitted to such wheels of varying rates of speed, irrespective of the speed of rotation of the motor, the motor or motors will move in unison with the frame carrying the traction-wheels as the same is vibrated horizontally in the act of steering the vehicle.

Such invention is fully shown and described in the following specification, of which the accompanying drawings form a part, wherein similar letters of reference designate like or equivalent parts wherever found throughout the several views, and in which—

Figure 1 is a front view of the front portion of an automobile of my improved form, and Fig. 2 is a side view of that portion of the construction shown in Fig. 2, Fig. 3 being a top plan view of the rotating frame upon which the motor or motors are mounted.

In the usual form of carriage which I prefer I use two motors $a$, which motors $a$ are connected together by a cross-piece $b$, which is connected to the vertical spindle $d$, carrying the steering-wheel $c$. The motors $a$ are mounted on the top of the crown-plate $e$, which is suitably cut away for allowing the transmission-belt $f$ to pass, as is also the lower supporting-plate $p$. This belt runs on a set of cone-pulleys $g$, which are keyed onto a shaft $h$, common to both motors $a$, and on a similar set of cone-pulleys $i$, keyed on the counter-shaft $j$.

The differential gear-shaft $j$ is mounted in the frame $k$ of the vehicle, and at each end carries a pinion $l$, gearing with the toothed wheels $m$, which are keyed, respectively, to the corresponding wheel $n$ of the vehicle. These two wheels $n$ of the fore carriage are mounted on the axle $o$.

The crown-plate $e$ is mounted on a similar lower plate $p$, which is fixed rigidly to the frame $k$. The advantages of this particular arrangement of crown-plate cut away as mentioned are that turning of the vehicle can be effected in such a manner that the wheel on that side of the vehicle toward which the turn is being made pivots on its rim and that by means of a suitable handle the speed may be controlled at will without the aid of toothed gear, which is always complicated and expensive.

Having now described my invention, what I claim, and desire to secure by Letters Patent, is—

1. In a device of the class described, the combination with a fifth-wheel consisting of two disks, the lower secured to the rear carriage and the upper to the fore carriage, means for vibrating the upper disk upon the lower disk, two traction-wheels carried by the fore carriage, a motor supported by the fore carriage above the disk thereof so as to move in unison therewith, and gearing passing through the central portion of the two disks and forming an actuating connection between the motor and the traction-wheels, substantially as shown and described.

2. In a device of the class described, the combination with a fifth-wheel consisting of two disks having central openings, the lower supported by the rear carriage and the upper by the fore carriage, means carried by the fore carriage for turning the same upon the fifth-wheel connection for steering purposes, two traction-wheels carried by the fore carriage, a motor located above the fifth-wheel, a differential pulley rotated by the motor, a differential pulley in actuating connection with the traction-wheels, and a belt passing through the openings of the fifth-wheels and forming an actuating connection between the two differential pulleys, substantially as shown and described.

In testimony that I claim the foregoing I have hereunto set my hand this 25th day of December, 1900.

CHARLES GOUCHON.

Witnesses:
ALFRED LEOPOLD LAVACHE,
ALFRED MARTIN.